US009369684B2

(12) United States Patent
Lim et al.

(10) Patent No.: US 9,369,684 B2
(45) Date of Patent: *Jun. 14, 2016

(54) IMAGE TONE ADJUSTMENT USING LOCAL TONE CURVE COMPUTATION

(71) Applicant: Apple Inc., Cupertino, CA (US)

(72) Inventors: Suk Hwan Lim, Mountain View, CA (US); D. Amnon Silverstein, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,332

(22) Filed: Feb. 16, 2015

(65) Prior Publication Data

US 2015/0181186 A1   Jun. 25, 2015

Related U.S. Application Data

(63) Continuation of application No. 14/023,159, filed on Sep. 10, 2013, now Pat. No. 8,958,658.

(51) Int. Cl.
*H04N 9/64* (2006.01)
*G06T 5/40* (2006.01)
*G06T 5/00* (2006.01)

(52) U.S. Cl.
CPC ............... *H04N 9/646* (2013.01); *G06T 5/008* (2013.01); *G06T 5/40* (2013.01); *G06T 2207/10016* (2013.01); *G06T 2207/20012* (2013.01);

(Continued)

(58) Field of Classification Search
None
See application file for complete search history.

(56) References Cited

U.S. PATENT DOCUMENTS

| 7,006,668 | B2 * | 2/2006 | Iguchi | G06T 5/009 358/522 |
| 7,593,603 | B1 | 9/2009 | Wilensky | |
| 7,643,035 | B2 * | 1/2010 | Toyama | G06T 5/007 345/589 |

(Continued)

FOREIGN PATENT DOCUMENTS

WO   2012/030718   3/2012

OTHER PUBLICATIONS

International Search Report and Written Opinion from PCT/US2014/051787, issued Dec. 2, 2014, Apple Inc., pp. 1-12.

(Continued)

*Primary Examiner* — Michael Osinski
(74) *Attorney, Agent, or Firm* — Robert C. Kowert; Meyertons, Hood, Kivlin, Kowert & Goetzel, P.C.

(57) ABSTRACT

Image tone adjustment using local tone curve computation may be utilized to adjust luminance ranges for images. Image tone adjustment using local tone curve computation may reduce the overall contrast of an image, while maintaining local contrast in smaller areas, such as in images capturing brightly lit scenes where the difference in intensity between brightest and darkest areas is large. A desired brightness representation of the image may be generated including target luminance values for corresponding blocks of the image. For each block, one or more tone adjustment values may be computed, that when jointly applied to the respective histograms for the block and neighboring blocks results in the luminance values that match corresponding target values. The tone adjustment values may be determined by solving an under-constrained optimization problem such that optimization constraints are minimized. The image may then be adjusted according to the computed tone adjustment values.

20 Claims, 10 Drawing Sheets

(52) U.S. Cl.
CPC .............. *G06T2207/20016* (2013.01); *G06T 2207/20021* (2013.01); *G06T 2207/20208* (2013.01)

(56) References Cited

U.S. PATENT DOCUMENTS

| | | | | |
|---|---|---|---|---|
| 7,649,564 B2* | 1/2010 | Suekane | ............ | H04N 5/23293 348/333.02 |
| 8,009,224 B2* | 8/2011 | Umeda | ................ | H04N 5/235 348/222.1 |
| 8,421,925 B2 | 4/2013 | Su et al. | | |
| 8,478,042 B2* | 7/2013 | Narasimha | ............ | H04N 5/243 348/221.1 |
| 8,577,142 B2* | 11/2013 | Otsuki | .................. | G06T 5/008 382/172 |
| 8,831,345 B2* | 9/2014 | Toda | .................... | H04N 1/407 348/234 |
| 8,958,658 B1* | 2/2015 | Lim | ....................... | G06T 5/40 348/234 |
| 2002/0008760 A1* | 1/2002 | Nakamura | ............. | H04N 5/208 348/222.1 |
| 2003/0152283 A1* | 8/2003 | Moriwaki | ............... | G06T 5/008 382/274 |
| 2004/0234155 A1* | 11/2004 | Hoshuyama | .......... | G06T 5/007 382/254 |
| 2006/0153441 A1* | 7/2006 | Li | .................... | H04N 1/40068 382/162 |
| 2007/0195171 A1* | 8/2007 | Xiao | ................ | G06K 9/00228 348/207.99 |
| 2007/0229863 A1* | 10/2007 | Ono | ...................... | G06T 5/008 358/1.9 |
| 2007/0248282 A1* | 10/2007 | Suzuki | ................... | G06T 5/008 382/282 |
| 2007/0269132 A1* | 11/2007 | Duan | ...................... | G06T 5/007 382/274 |
| 2008/0042927 A1* | 2/2008 | Jung | ................... | G09G 3/3426 345/39 |
| 2009/0060367 A1* | 3/2009 | Wei | ........................... | G06T 5/20 382/260 |
| 2009/0060379 A1* | 3/2009 | Manabe | ............... | H04N 5/2351 382/274 |
| 2009/0073278 A1* | 3/2009 | Ogawa | ..................... | H04N 1/58 348/222.1 |
| 2009/0231467 A1* | 9/2009 | Yamashita | ............. | G03B 7/091 348/234 |
| 2010/0074553 A1* | 3/2010 | Choi | ........................ | G09G 3/36 382/274 |
| 2010/0209015 A1* | 8/2010 | Yu | ........................... | G06T 5/009 382/270 |
| 2011/0142342 A1* | 6/2011 | Otsuki | .................... | H04N 5/57 382/172 |
| 2011/0194766 A1 | 8/2011 | Otsuki | | |
| 2011/0268358 A1* | 11/2011 | Ikebe | ........................ | G06T 5/008 382/172 |
| 2012/0127371 A1* | 5/2012 | Watanabe | ............... | G06T 5/007 348/687 |
| 2013/0182185 A1* | 7/2013 | Koyama | ............... | H04N 1/6027 348/672 |
| 2014/0176789 A1* | 6/2014 | Kubota | .............. | H04N 5/23219 348/362 |
| 2014/0226903 A1* | 8/2014 | Kimura | ................ | H04N 1/6027 382/173 |

OTHER PUBLICATIONS

"Tone Mapping HDR Images Using Optimization: A General Framework", Guoping Qiu et al., Sep. 2010, pp. 3129-3132.

"Realization of Balanced Contrast Limited Adaptive Histogram Equalization (B-CLAHE) for Adaptive Dynamic Range Compression of Real Time Medical Images", Raheel Khan et al., 2013, pp. 117-121.

Office Action from Taiwan Patent Application No. 103129596, Dated Jan. 14, 2016 (Taiwan Version and English Translation), Apple Inc., pp. 1-7.

* cited by examiner

IMAGE TONE ADJUSTMENT USING LOCAL TONE CURVE COMPUTATION

This application is a continuation of U.S. patent application Ser. No. 14/023,159, filed Sep. 10, 2013, now U.S. Pat. No. 8,958,658, which is hereby incorporated by reference in its entirety.

BACKGROUND

Modern digital images frequently require the adjustment or reduction of the dynamic range between lighter and darker areas. In some cases adjustment is required in order to approximate the appearance of a higher dynamic range in a medium that has a more limited dynamic range. For example, real world scenes may have a wide luminance range and current digital imaging technology may enable the capturing of the full dynamic range of a natural scene. However, different display media, such as printed media, display monitors, and projectors, may all have different capabilities which may or may not be inadequate to reproduce the full range of light intensities represented in a digital image. When displayed using these media, an image may have areas in which details are note visible. Thus, the dynamic range of an image may need to be compressed for a particular medium so that the image appears aesthetically pleasing.

Tone mapping is one current technique used to map one set of colors to another, such as to adjust the overall dynamic range of a digital image. However, tone mapping frequently introduces various artifacts or effects in images, such as halos or rings around dark objects, overly saturated colors, or an unnatural appearance due to contrasts distortions.

SUMMARY

The systems and methods described herein demonstrate a variety of techniques for image tone adjustment using local tone curve computation. For example, images may be adjusted so that shadows are brightened while the highlights are darkened to show more image details. The dynamic range of an image may be adjusted for various reasons, depending on the particular application, according to various embodiments. In some embodiments producing an aesthetically pleasing image may be an overall goal, while in other embodiments a goal might be the desire to reproduce as many image details as possible, or to maximize overall contrast within the image.

An image may have dark areas that need to be lightened in order to visually bring out detail. Similarly, the image may have bright areas in which the details are washed out. Image tone adjustment using local tone curve computation may reduce the overall contrast of an image, while maintaining local contrast in smaller areas, such as in images capturing brightly lit scenes (e.g., in sunlight), where a large difference in light intensity exists between the brightest and darkest areas.

Using the techniques described herein, the luminance of an image may be modified while minimizing (or eliminating) the introduction of image artifacts. An overall desired visual appearance for an image may be generated and used in conjunction with local luminance histograms to compute tone adjustment values, such as a local tone curve or a set of gain values, according to which the image may be adjusted.

For example, the image may be considered as a set of blocks or image portions. An optimization problem representing the relationship between the target luminance values and luminance histograms may be solved to compute a set of tone adjustment values for each image block. The image may then be adjusted according to the determined tone adjustment values, such as by using local tone curves to adjust the luminance value of pixels within the image, as described herein.

Figure 1:
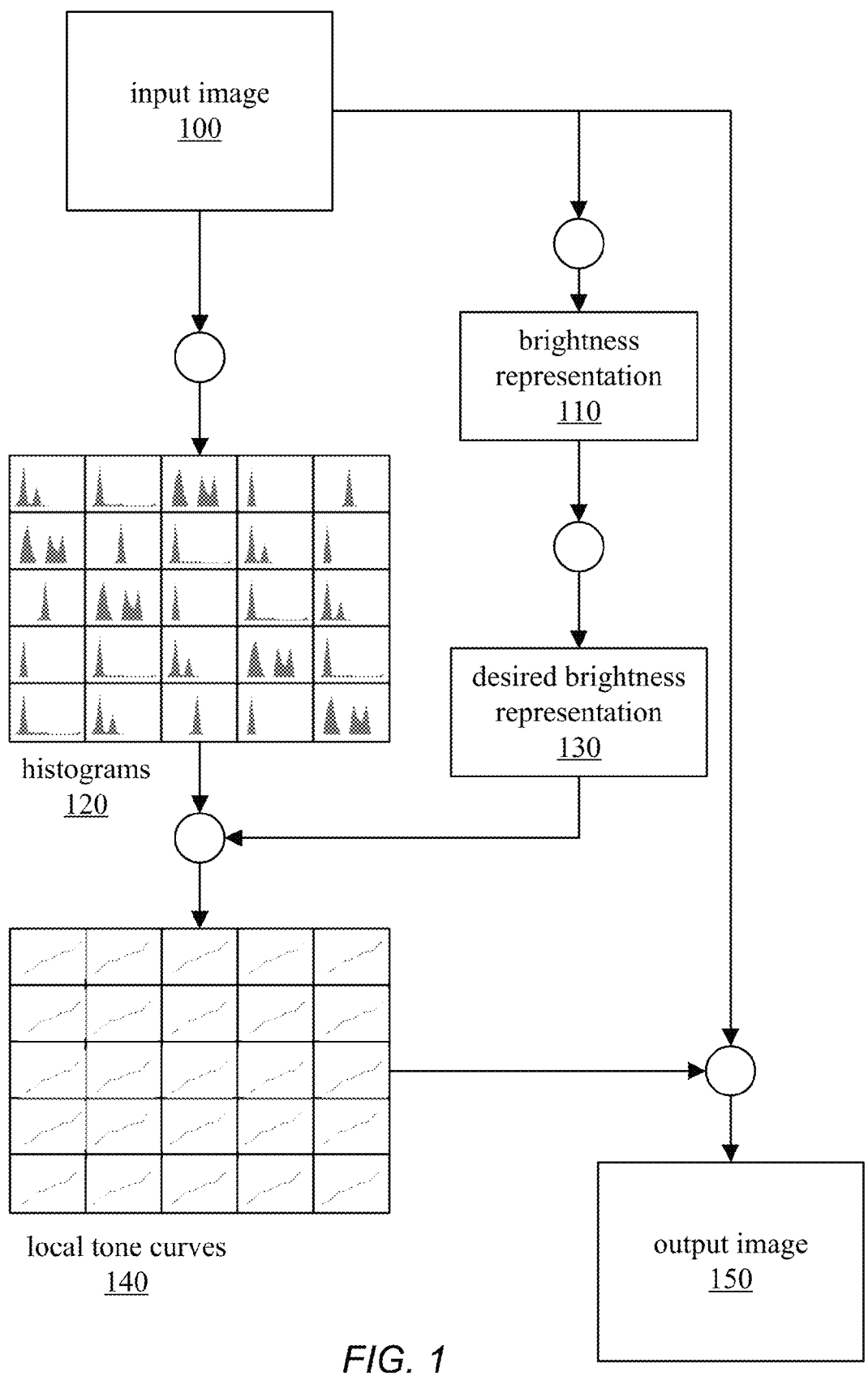
FIG. 1 is a logical block diagram illustrating one overall process for using image tone adjustment using local tone curve computation, according to one embodiment.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Image tone adjustment using local tone curve computation Images may adjust the overall luminance range of an image. For example, an image with a high dynamic range may be adjusted so that it may be rendered onto displays with lower bit depths (e.g., that cannot proper render the high dynamic range of the image).

Using the techniques described herein, the overall luminance range of an image may be modified while minimizing (or eliminating) the introduction of image artifacts. In some embodiments, the overall luminance range of the image may be reduced, while in other embodiments, the local luminance values may be modified without changing the overall luminance range of the entire image. A brightness representation (e.g., a thumbnail) of an image may be generated and adjusted to determine desired luminance values for the overall luminance range of the image. The desired luminance values may be used to construct a desired brightness representation that includes target luminance values for corresponding portions (e.g., logical blocks) of the image.

The image may be divided into multiple logical blocks, and a luminance histogram may be generated for each block. For each block, a set of tone adjustment values may be computed, that when applied to the block's histogram will result in the luminance values that match corresponding desired values for that block. The computed tone adjustment values may take any of various forms, according to different embodiments. For example, in some embodiments, a local tone curve may be computed while in other embodiments a set of gains (from which a tone curve may be determined) may be computed. A block may be considered in conjunction with one or more other blocks. The set of tone adjustment values for each block may be determined such than when applied to the histogram for the block and possibly also applied to histograms for neighboring blocks (e.g., other blocks around the block), the resulting luminance values for each block match the target luminance values for the respective block. Thus, each block's gain values may be determined using the other blocks as well.

In order to determine the tone adjustment values, an under-constrained optimization problem/equation may be solved (e.g., using standard problem solving techniques) such that one or more optimization constraints are minimized. The image may then be adjusted according to the tone adjustment values. For example, in one embodiment a local tone curve may be computed for each block and the image may be adjusted using the local tone curves. Each pixel of the image may be adjusted by a combination of multiple local tone curves, according to some embodiments. Using a combination of local tone curves may, in some embodiments, avoid the introduction of visual artifacts in the resulting image.

A set of tone adjustment values, such as gains, gain factors, or a local tone curve, may be determined by solving an under-constrained optimization problem/equation. The tone adjustment values, when applied to the luminance histogram for the respective block (e.g., the block for which they were determined) generate new luminance values that match the target luminance value(s) for the block. In some embodiments, a set of tone adjustment values may be determined for a block such that when the adjustment values are jointly applied to respective histograms for the block and one or more other (e.g., neighboring) blocks new luminance values are generated by match respective target luminance values for the block and the other blocks.

Please note, while descriptions of solving optimization problems/equations may be described herein with reference to determining a local tone curve or a set of gains (or gain factors), in general any of various sorts of tone adjustment values may be used in conjunction with the other techniques and features of image tone adjustment using local tone curve computation, according to various embodiments.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In general, local tone mapping may allow an image including high dynamic range (HDR) scenes to be rendered onto displays with lower bit depths (e.g., low dynamic range or LDR). Typically, shadows may be brightened and highlights may be darkened such that more image details can be seen in those high contrast areas.

The techniques, methods and/or algorithms described herein may be used in any of various software and/or hardware systems. For example, a digital camera (either still or video) may utilize image tone adjustment using local tone curve computation in order to modify images captured using an HDR mode, according to one embodiment. In other embodiments, a stand along software program may implement the techniques described herein for use in modifying previously captured digital images.

As noted above, image tone adjustment using local tone curve computation may be used to modify or reduce the overall dynamic range of an image, such as to allow an image captured using a high dynamic range (HDR) to be displayed on a device with a lower dynamic range while still remaining visually appealing or visually matching the original scene. Turning now to FIG. 1, which illustrates one embodiment of an overall process of using image tone adjustment using local tone curve computation to adjust the tonal range (e.g., luminance range) for an image.

As illustrated in FIG. 1, an input image 100 may be captured or received and a brightness representation 110 may be generated based on the input image. For example, in some embodiments, the brightness representation may include only information regarding the lightness, or luminance, (e.g., the luminance channel) from input image 100. How the lightness or brightness information from input image 100 is recorded, captured or otherwise represented in brightness representation 110 may vary from embodiment to embodiment.

Brightness representation 110 may be used as a basis from which to generate a desired brightness representation 130. Desired brightness representation 130 may, in some embodiments, include luminance information indicating a final desired, or target, brightness representation of input image 100 (or in some cases of an image similar to input image 100). For example, one or more tone mapping algorithms may be applied to brightness representation 110 in order to modify the existing brightness information, such as to reduce the dynamic range. Desired brightness representation 130 may have brighter dark areas and darker bright (or "blown out") areas than corresponding areas in brightness representation 110. Thus, desired brightness representation 130 may be considered to have a compressed dynamic range as compared to brightness representation 110 (or input image 100), according to some embodiments.

In some embodiments, brightness representation 110 and/or desired brightness representation 130 may be generated at a lower resolution than input image 100. For example, in one embodiment, brightness representation 110 may be a downsampled, luminance-only, version of input image 100. Thus, in some embodiments, brightness representation 110 may be considered a thumbnail version of the input image 100. In other embodiments, however, brightness representation 110 and desired brightness representation 130 may be at the same resolution as input image 100.

Additionally, while described herein as two distinct entities, namely brightness representation 110 and desired brightness representation 130, in some embodiments, brightness representation 110 may be converted into desired brightness representation 130 in place. Thus, brightness representation 110 and desired brightness representation 130 may refer to two different versions of the same representation of input image 100.

As will be described in more detail regarding FIG. 4, desired brightness representation 130 may include target luminance values corresponding to various portions (e.g., blocks) of input image 100. In some embodiments, a single target luminance value may be determined for each block of the image, while in other embodiments, multiple target luminance values may correspond to a single block of image.

As also shown in FIG. 1, input image 100 may be logically divided into multiple blocks and a histogram may be generated for each block, such as histograms 120. For example, FIG. 1 illustrates one embodiment in which input image 100 may be logically divided into 25 blocks using a 5×5 pattern and an individual histogram may be generated for each block. In other embodiments, an image may be divided into other numbers of blocks (e.g., 5×6, 8×8, 5×7, etc.). In general, any suitable division of an image into blocks may be utilized according to different embodiments. In some embodiments, each of histograms 120 may represent a luminance only histogram. In other words, for each block, a histogram may be generated that represents the distribution of luminance (e.g., lightness or brightness) within the block, according to one embodiment.

A luminance histogram, such as represented in histograms 120, may include the relative distribution of brightness within input image 100. A luminance histogram may include luminance distribution data for the pixels within a block of the image across multiple luminance levels. For example, a histogram may include a number of bins, each corresponding to a different luminance range. The value for each bin may represent the percentage of pixels within the block that have a luminance value within the luminance range corresponding to that bin.

For example, when generating a histogram for a particular block in input image 100, the color value for each pixel within the block may be converted so that represents a luminosity value, such as may be based on a weighted average of the individual color values (e.g., RGB) of the pixel. The luminance histogram may then be generated by counting how many of the pixels within the block represent luminance levels within the different luminance ranges included in the histogram. The histograms represented by histograms 120 may represent different types of brightness information and may be generated using a different number of ranges, (e.g., bins) in different embodiments.

As will be described in more detail below, the individual block histograms 120 and the target luminance values from desired brightness representation 130 may be used to generate individual local tone curves for the blocks, such as represented by local tone curves 140 in FIG. 1. In some embodiments, these local tone curves may represent the desired tonal range of the portion of image within the particular image block. Local tone curves 140 may then be applied to the image data, such as to input image 110, to generate output image 150. Thus, output image 150 may represent a new version of input image 100 with a different tonal quality or luminance range. For example, in one embodiment, the overall tonal range may be reduced in output image 150 as compared to input image 100, while in other embodiments, the overall range may be the same, but individual brightness (e.g., luminance) levels may be modified or adjusted within the image, such as to improve visual appeal and/or remove contrast distortions.

While output image 150 is mainly described as being a modified version of input image 100, in some embodiments, input image 100 may represent a different image from the one used to generate output image 150. In some embodiments, input image 100 may be used to generate brightness representation 110, desired brightness representation 130, histograms 120 and local tone curves 140, but subsequently, local tone curves 140 may be used to generate output image 150 based on a different input image that may be similar to input image 100. For example, the images may be part of a video stream and input image 100 may be used to generate local tone curves 140 which, in turn, may be used to modify a subsequent image in the video stream (e.g., since the brightness ranges between individual images within the stream may not change much from one image to the next).

Figure 2:
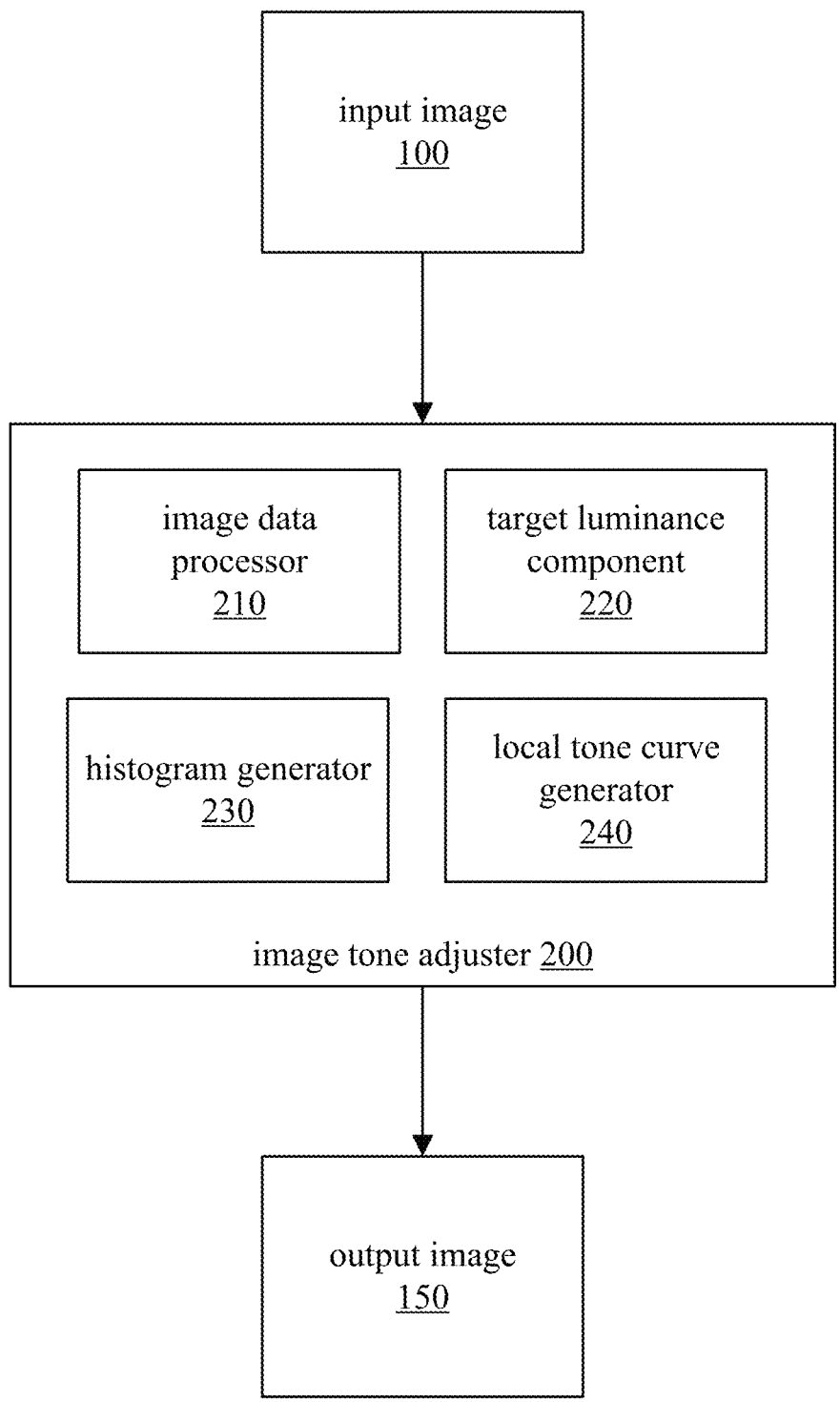
FIG. 2 is a logical block diagram illustrating one embodiment of a system implementing image tone adjustment using local tone curve computation, as described herein.

FIG. 2 is a logical block diagram illustrating one embodiment of a system implementing image tone adjustment using local tone curve computation, as described herein. As shown in FIG. 2, an image tone adjuster 200 may include various components, each responsible for performing one or more tasks related to image tone adjustment using local tone curve computation, according to various embodiments. Image tone adjuster 200 may receive input image 100, or at least image data for input image 100. The term "image" as used herein may refer to any collection of image data, and is not intended to refer to a particular image format. For example, input image 100 may represent the raw image data received from a camera image sensor rather than the final image file that may be saved to memory within a particular device.

Image tone adjuster 200 may include an image data processor 210 that may generate brightness representation 110 from input image 100. Similarly, target luminance component 220 may analyze brightness representation 110 to generate desired brightness representation 130, according to some embodiments. Image tone adjuster 200 may utilize a histogram generator 230 to generate local histograms, such as for each logical block within input image 100. In some embodiments histogram generator 230 may be part of image data processor 210. Additionally, a local tone curve generator 240 may use the histograms created by histogram generator 230 as well as desired brightness representation 110 from target luminance component 220 in order to generate local tone curves, or other tone adjustment values, that may ultimately be used to create the output image 150.

In some embodiments, image tone adjuster 200 (and/or its included components) may be a part of a digital camera, or part of a device that includes a digital camera, such as a mobile device (e.g., phone, tablet, etc.). In other embodiments, image tone adjuster 200 (and its included components) may be utilized separately from a digital camera device. For example, image tone adjuster 200 may be part of a post processing program or device that is used to manipulate images separately from the digital camera that captured the images.

In general, image tone adjuster 200 and/or its individual components, may be implemented in hardware, software, firmware or a combination of hardware, software and/or firmware. In addition, some components of image tone adjuster 200 may be implemented in hardware, while other components may be implemented in software or firmware, according to various embodiments. For example, in one embodiment, image data processor 210 and histogram generator 230 may be implemented in hardware, while target luminance component 220 and local tone curve generator 240 may be implemented in software. Furthermore, while illustrated in FIG. 2 as four separate components, the individual components of image tone adjuster 200 may be combined (or divided) into a different number of components. The components illustrated in FIG. 1 (e.g., image data processor 210, target luminance component 220, histogram generator 230, and local tone curve generator 240) are used for ease of discussion and different embodiments may include more, less and/or different components to perform the same functions, methods and/or techniques described herein.

Figure 3:
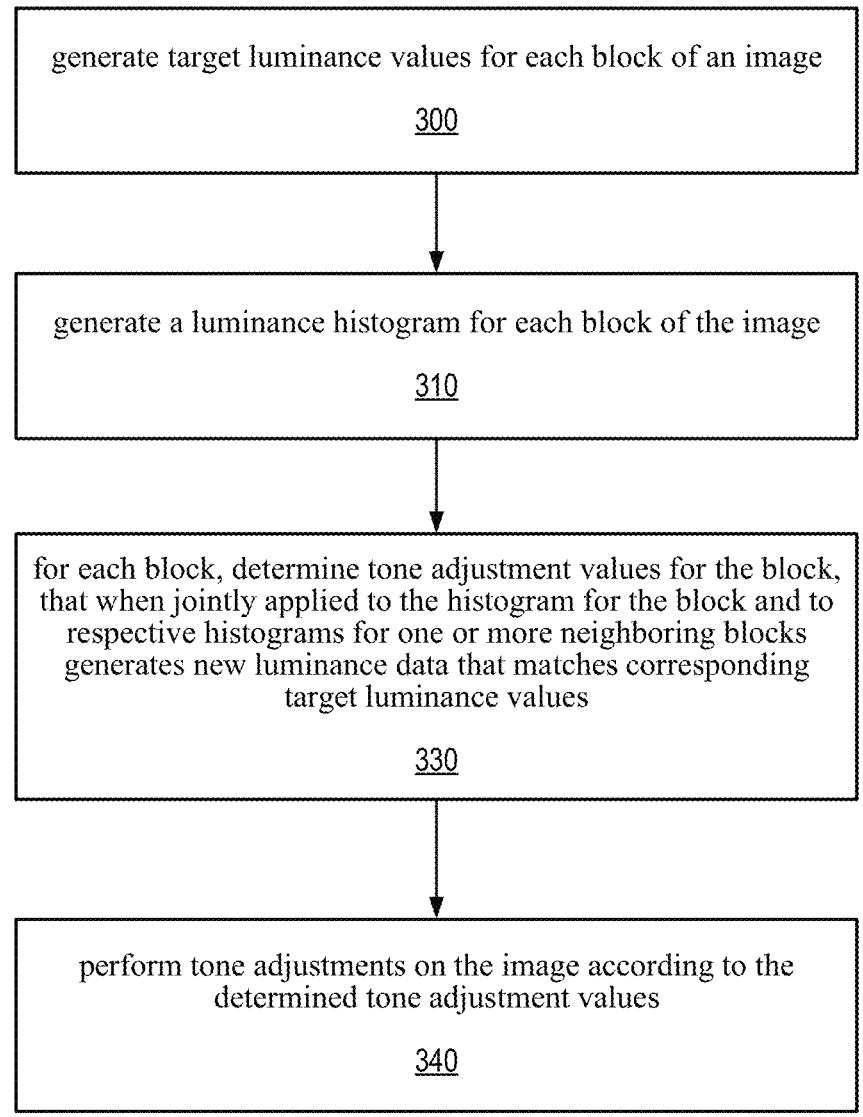
FIG. 3 is a flowchart illustrating one embodiment of a method for image tone adjustment using local tone curve computation, as described herein.

FIG. 3 is a flowchart illustrating one embodiment of a method for image tone adjustment using local tone curve computation, as described herein. As shown in block 300, image tone adjustment using local tone curve computation may involve the generation of target luminance values for each block of an image. An image may be divided into one or more blocks for use with image tone adjustment using local tone curve computation, according to various embodiments. For example, in one embodiment, an image may be divided into 64 blocks (e.g., 8×8), while in other embodiments, different number of blocks may be used. In yet other embodiments, the number of blocks may be determined based on the size of the image. For example, each block could be a particular, fixed size (e.g., in terms of pixels). In general, any suitable method may be used to divide an image into one or more blocks for use with image tone adjustment using local tone curve computation, as described herein.

Please note that the division of an image into blocks may not involve the actual separation of portions of the image. In other words, the blocks and/or divisions between the blocks may be logically determined, without actually moving any blocks out of the image. In some embodiments, the techniques described herein may be performed in image data that is not stored contiguously as a single image. Additionally, some (or all) of the methods or techniques described herein may be performed on streaming image data as that data is received (e.g., from a camera image sensor) before all the data has been received.

As noted above, target luminance values may be generated for each block of the image. As will be discussed in more detail regarding FIG. 4, a luminance or brightness representation, such as brightness representation 110, of the image may be generated and then modified to represent a desired brightness representation, such as desired brightness representation 130. As noted above, the brightness representation may be modified to change the overall brightness range of the image, such as to bring out more visual contrast in overly bright or dark areas, according to some embodiments. In other embodiments, the overall luminance range of the image data may be reduced for other reasons, such as to reduce the number of pixels needed to represent luminance information for the image.

The desired brightness representation may include target luminance values for each of the blocks of the image. In some embodiments, the brightness representation and/or the desired brightness representation may be at a lower resolution (e.g., down sampled) than the original image. In some embodiments, a lower resolution brightness representation and/or desired brightness representation may be used in order to reduce the overall computational cost of performing image tone adjustment using local tone curve computation. In some embodiments, a desired brightness representation may include a single target luminance values for each block, while in other embodiments, multiple target luminance values may correspond to each block.

In some embodiments, a single component, such as image data processor 200 may perform the actions described above regarding blocks 300 and 310, while in other embodiments, separate components, implemented in software, hardware or a combination of both, may each perform a portion of the actions described above regarding blocks 300 and 310.

As shown in block 330, tone adjustment values, such as a set of gain values (e.g., gains) or local tone curve, may be determined for each block, according to one embodiment. The tone adjustment values for a particular block may be determined such than when they are applied to the histogram for the block and also applied to the histograms for one or more neighboring blocks, luminance values are generated that match the target luminance values for the respective blocks. In other words, tone adjustment values may be determined for a block taking into account that block's neighbors. The number of neighboring blocks used when determining a block's tone adjustment values may vary from just a few nearby neighbors to the entire set of blocks for the image. In some embodiments, generating tone adjustment values that are jointly applied to a combination of blocks, rather than for a single block in isolation, may reduce visual artifacts when the final image is generated.

As shown in block 340, one or more tone adjustments may be performed on the image according to the determined tone adjustment values. For example, the tone adjustment values may be applied to image data for the image to perform one or more tone adjustments, such as to reduce the overall luminance range in the image, according to some embodiments. For example, in one embodiment, a local tone curve may be generated (e.g., as a set of tone adjustment values) for each block and the local tone curves used to make tone adjustments to the image. In another embodiment, a set of gains may be determined for each block and the gains for each block may then be applied to the local histograms for the individual blocks to generate local tone curves that may be applied to image data for the image.

Figure 4:
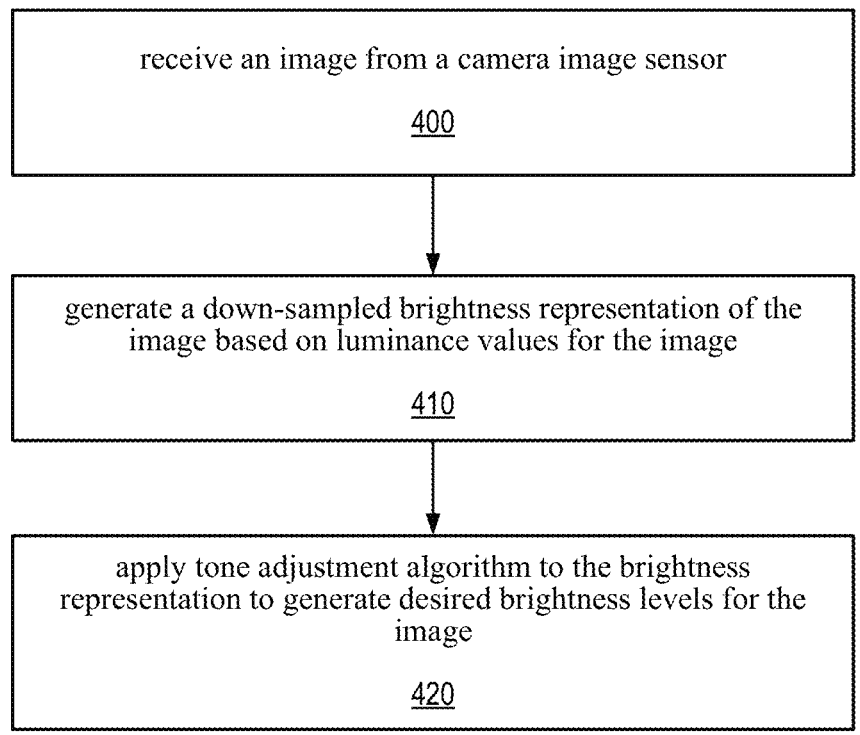
FIG. 4 is a flowchart illustrating one embodiment of a method for generating target luminance values, as described herein.

FIG. 4 is a flowchart illustrating one embodiment of a method for generating target luminance values, as described herein. As shown in block 400, an image may be received from a camera image sensor and a down-sampled brightness representation of the image may be generated based on luminance values for the image as illustrated in block 410, according to one embodiment. For example, the image data received from the camera image sensor may be converted into luminance values and then down sampled to generate a brightness representation of the image. In some embodiments, the brightness representation may be considered a thumbnail representation including luminance data for the image. In one embodiment, the brightness representation may include one luminance value corresponding for each block in the original image.

Any of various methods may be used to generate the brightness representation, whether down sampled or not, according to various embodiments. For example, in one embodiment, the luminance values for every pixel in an image block may be averaged together and used in the brightness representation. In other embodiments, other methods of determining luminance values for the brightness representation may be used.

Additionally, a tone adjustment algorithm and/or technique may be applied to the brightness representation to generate target luminance values (e.g., desired brightness levels) for an image, according to some embodiments. According to one embodiment, an algorithm configured to reduce the overall luminance range of the image (as modeled in the brightness representation) may be applied to the brightness representation. In other embodiments, the overall luminance range may not be changed, but the individual luminance levels within the image may be adjusted in different areas of the image.

For example in one embodiment, a high pass filter algorithm may be applied to the brightness representation in order to reduce the highest luminance values. In other embodiments, other or additional algorithms and/or techniques may be applied to generate desired brightness levels and/or target luminance values for the image.

Figure 5:
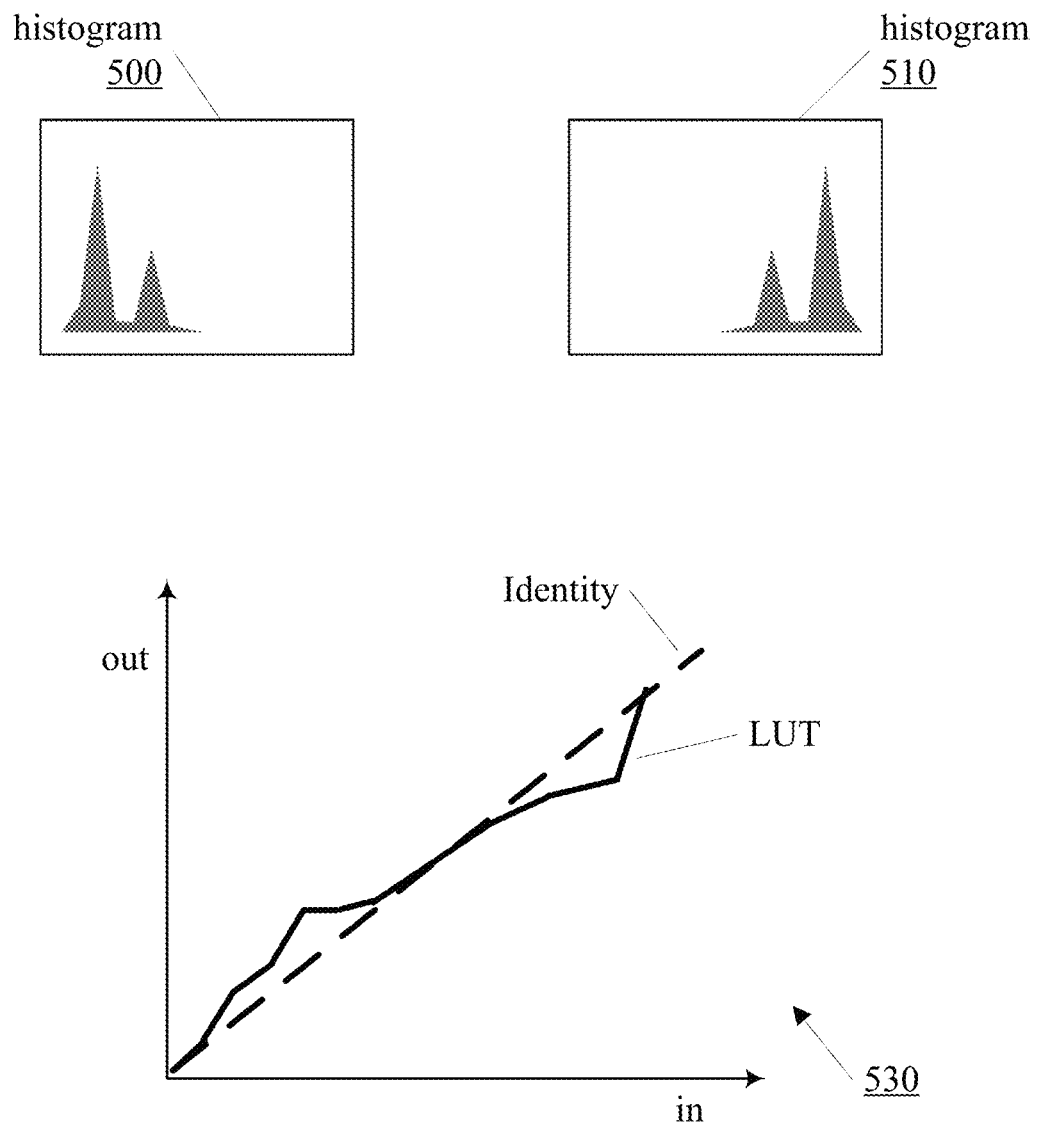
FIG. 5 is a logical block diagram illustrating the application of image tone adjustment using local tone curve computation on two histograms, according to one embodiment.

FIG. 5 is a logical block diagram illustrating the application of image tone adjustment using local tone curve computation on two histograms to generate a lookup table (LUT), according to one embodiment. As noted above, for each logical block of an image, a local tone curve (or, alternatively a set of gains) may be determined taking into account one or more neighboring blocks. The determined local tone curve (or gain values) may be used, in conjunction with the histograms, to generate one or more tone curves, such as local tone curves 140, that represents a remapping of the luminance data over the dynamic range. In some embodiments, such tone curve may be considered a lookup table (LUT) allowing the remapping of luminance values within the overall dynamic range. For example, FIG. 5 illustrates two histograms that may represent the histograms for two logical blocks within an input image.

As will be described in more detail below regarding FIG. 6, a local tone curve, or a set of gain values, may be determined, or computed, that when applied to the histograms, may result in luminance values that match (or approach) the desired luminance values, according to some embodiments. In some embodiments, histogram 500 and histogram 510 may both be considered when determining a local tone curve for a block (e.g., corresponding to one of the two histograms). The resulting local tone curve may be used to construct graph 530, which represents a LUT that may be used to remap the luminance value for pixels within the logical block for which the gain values were determined. For instance, the LUT curve (or line) within graph may be used to convert values around the identity line. Within graph 530, the lower luminance (e.g., darker) values are closer to the origin of the two axes, while higher luminance (e.g., brighter) values are to the right and up on the respective axes.

Thus, in the example illustrated in FIG. 5, the luminance values represented in histogram 500, which are more heavily distributed in lower luminance ranges, may be brightened, as shown by LUT curve being above the identity line in the lower luminance ranges within graph 530, according to some embodiments.

Figure 6:
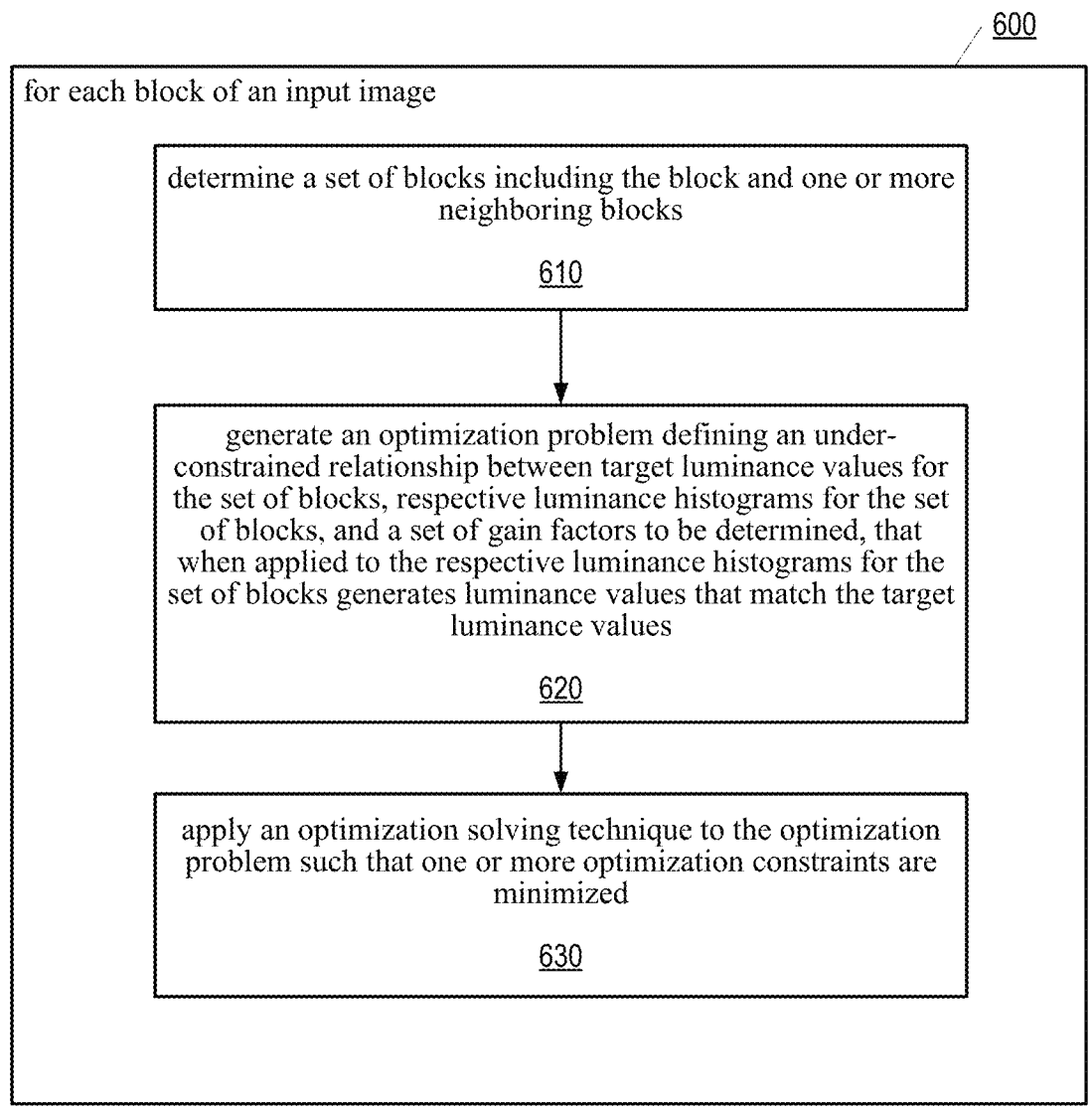
FIG. 6 is a flowchart illustrating one embodiment of a method for determining a set of gain values for use in image tone adjustment using local tone curve computation, as described herein.

FIG. 6 is a flowchart illustrating one embodiment of a method for determining a set of gain values for use in image tone adjustment using local tone curve computation, as described herein. While described below regarding determining sets of gain factors, in some embodiments, determining local tone curves or other tone adjustment values may also apply to the method illustrated in FIG. 6.

As shown in block 600 and block 610, for each block of an input image, a set of blocks may be determined that includes the block itself and one or more neighboring blocks. As noted above, gain values may be determined for a block based on respective luminance histograms for the block and for one or more neighboring blocks. For example, in one embodiment, the eight blocks surrounding a particular block may be used as the set of blocks for determining the gains for the particular block. In other embodiments, other numbers of neighboring blocks may be used.

As illustrated in block 620, determining the gains for a block may involve generating an optimization problem defining an under-constrained relationship between the target luminance values for the set of blocks, the respective luminance histograms for the set of blocks and the set of gain factors to be determined. The gain factors may be determined such that when applied to the luminance histograms for each block in the set of blocks (e.g., the particular block and its neighbors) luminance values are generated that match the respective target values for the blocks, according to some embodiments.

Thus, for each block, a set of gains is computed that when applied to the luminance histogram for the block generates luminance values that match the target luminance values (e.g., desired brightness levels) for the block. However, the gains for a block are not determined for that block in isolation. Instead, in some embodiments, the gains may be determined for a block talking into account the other block, such as one or more neighboring blocks, as well. When the determined gains are applied to the respective local histogram for each of the neighboring blocks luminance values are generated that match the target luminance values for that respective block. Thus, a set of gain values may be determined for each block, but each block's gain values may be determined based on neighboring blocks as well, according to some embodiments.

In order to determine the set of gain values for a particular block, an optimization problem or equation is defined according to an under-constrained relationship between the target luminance values, the local histograms (of the block and its neighbors) and the gain values to be determined.

For example, in one embodiment, the equation:

$$H'Rx = m$$

may be used as an optimization problem to be solved in order to obtain a set of gains for a particular logical block. Within the equation, 'H' may represent an M×N matrix of N histograms to be solved jointly (e.g., for the block and neighboring blocks), each of size M (e.g., M bins within each histogram). 'R' may represent an M×M diagonal matrix including luminance values corresponding to the brightness for each bin with the histograms. For example, each value in 'R' may represent an average, mean or central value within the luminance range for a particular bin with the histograms. Within the equation, 'm' may represent an N×1 vector including the target luminance values for each histogram (e.g., for each logical block) in 'H'. This optimization problem may be solved jointly for all the histograms in 'H' to obtain 'x', an M×1 vector of gain values, each corresponding to a particular histogram bin (and therefore to a particular luminance range).

In another embodiment, the optimization problem or equation may be defined to determine local tone curves instead of gains (or gain factors). For example, in one embodiment, the equation:

$$H'y=m$$

may be used as an optimization program to be solved in order to obtain one or more local tone curves (e.g., a local tone curve for the block and possibly one or more neighboring blocks). Within the equation, 'y' may represent a local tone curve or may represent Rx from the previous equation. Hence, in some embodiments, a set of gains may be determined and subsequently local tone curves may be computed using the determined gains, but in other embodiments, local tone curves may be determined from solving the optimization problem and used to adjust the image.

Then, as shown in block 630, an optimization solving technique may be applied to the optimization problem such that one or more optimization constraints are minimized. In general any of various optimization problem solving algorithms or techniques may be used to compute the gain values. In some embodiments, more than one possible solution to the problem may exist and the problem may be solved such that one or more optimization constraints are minimized (e.g., in order to have 1 "optimal" solution out of the many possible solutions).

For example, in one embodiment, one possible set of optimization constraints may attempt to normalize the resulting gains (e.g., keep a resulting tone curve close to the identity line) while simultaneously minimizing the rate of change across the gains (or the resulting tone curve). Such an example optimization may be represented by the following figure-of-merit in relation to the equation H'Rx=m, discussed above.

$$\|x-1\|^2 + \alpha^* \|Dx\|^2$$

Please note that there may be other conditions that may be used to constrain the solution to the optimization problem. In one embodiment, a smoothness constraint may be used to maximize the smoothness (e.g., minimize any abrupt changes) of a resulting tone curve. For example, minimizing the derivative of the gains ('Dx' in the above relation) may result in minimizing the rate of change among the gains and thereby maximizing the smoothness of a resulting tone curve. Alternatively, minimizing the derivative of values resulting from applying gains to bin values (e.g., 'DRx' in place of 'Dx' in the above relation) may also be utilized as an optimization constraint to ensure smoothness of a resulting tone curve. In another embodiment, an identity constraint may be used to ensure that any resulting tone curve minimizes its deviation of the unity or identity curve. For instance, normalizing x−1, as in the above relation, may ensure that the resulting tone curve does not vary much from the identity slope (as compared to other potential solutions to the optimization problem).

In yet another example, using an optimization constraint ensuring that the derivative of a gain is always positive (e.g., 'Dx>0' or 'DRx>0') may be used to prevent (or minimize) the chance of tone inversion within areas of an adjusted image (e.g., maximize the monotonicity of the resulting tone curve).

Additionally, a positive slope constraint may be utilized to ensure that any resulting tone curve has a positive slope while minimum and/or maximum slope constraints may also be utilized to further characterize the resulting solution. In some embodiments, minimum or maximum values for the determined gains may be used to ensure that the slope of a resulting tone curve is neither too shallow nor too steep. For example, ensuring a minimum gain of 0.25 and a maximum gain of 4.0 may be used to refine the resulting solution to the optimization problem. Such minimum and maximum constraints may be applied either during or post problem solving and may utilize one or more quadratic programming tools. In addition, in some embodiments, the resulting solution (either as gains, a tone curve and or a lookup table) may be adjusted, such as to enhance the smoothness of a resulting tone curve.

As noted above, in some embodiments, the optimization problem may be defined to determine local tone curves (e.g., for the block and possibly neighboring blocks). Thus, in some embodiments, optimization constraints may be defined in terms of tone curves (e.g., instead of gains).

Additionally, the specific optimization problem and constraints used may vary from embodiment to embodiments. For example, different equations and constraints may be used to adjust the final image appropriately for different types of displays with different rendering capabilities (such as LCD screens, e-paper, mobile phones, etc.). Additionally, while the example optimizations and constraints are described above in terms of gains and/or gain values, similar optimization and constraints may be used when determining local tone curves without determining gain values, After a set of gains has been determined for each of the logical blocks of an image, those gains may be used to generate local tone curves for each block. For example, if a set of gains is determined that includes one gain for each corresponding bin of a histogram, multiplying the gain values by the corresponding brightness values for the bins (e.g., average, mean or center value for the range represented by the bin) may result in a local tone curve for the respective logical block, according to some embodiments. In other embodiments, local tone curves are determined without first determining a set of gains, as described above. The local tone curves may subsequently be used to adjust an image (e.g., to perform local tone mapping), as will be described in more detail below.

Figure 7:
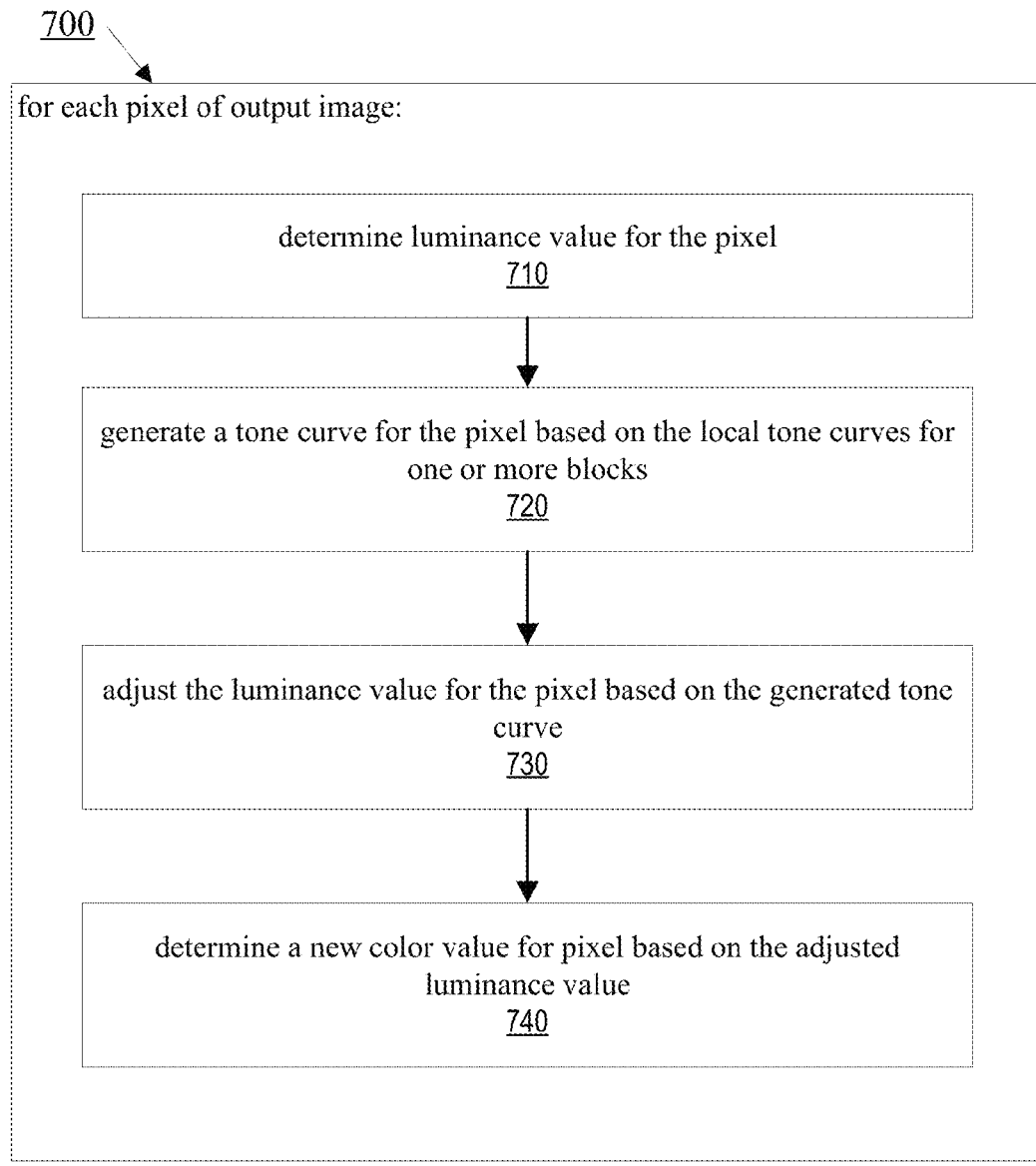
FIG. 7 is a flowchart illustrating one embodiment of a method for applying image tone adjustment using local tone curve computation to an image, according to one embodiment.

FIG. 7 is a flowchart illustrating one embodiment of a method for applying image tone adjustment using local tone curve computation to an image, according to one embodiment. As shown in blocks 700 and 710, a luminance value may be determined for each pixel of the image.

For each pixel, a tone curve may be generated for the pixel based on the local tone curves for one or more blocks. For example, the local tone curve for the block in which the pixel resides, as well as possibly the local tone curves for one or more neighboring blocks may be combined into a single local tone curve for the pixel. In one embodiment, an interpolated local tone curve may be generated based on weighting the individual local tone curves according to how far the pixel is from the center of each block, as will be described in more detail below regarding FIG. 8. The luminance value for the pixel may then be adjusted based on the generated tone curve, as shown in block 730.

Please note, while described in terms of generating a separate, new, tone curve for use with adjusting the pixel and then adjusting the luminance value of the pixel based on that new tone curve, in some embodiments, the individual local tone curves of the blocks may be used to adjust the luminance value of the pixel without actually generating a separate, new tone curve for the pixel. For example, each local tone curve to be used may be weighted and applied to the luminance value for the pixel in a cumulative manner such that the total adjustment to the luminance value of the pixel may be same as if a separate, new local tone curve were generated.

The adjusted luminance value for the pixel may be used to generate (or converted into) a new color value for the pixel, as shown in block 740. For example, a pixel's RGB value may be converted into a luminance value which is adjusted based on an interpolated tone curve and then converted back into an RGB value. Please note that other color and/or brightness schemes (or color spaces) may be used other than RGB, according to various embodiments.

Similarly, the luminance value for a pixel may be generated and adjusted in any of various manners, according to different embodiments. While the example described herein may involve the use of a tone curve, in some embodiments, a LUT may be generated and used or the gains themselves may be used to modify the pixel in other manners. For example, rather than converting the RGB value of a pixel to a luminance value, adjusting the luminance values according to the determined gain values and then converting the luminance value back into an RGB value for the pixel, in some embodiments, the equivalent luminance adjustment may be performed within a different color space, such as by adjusting the individual RGB values for the pixel.

Figure 8:
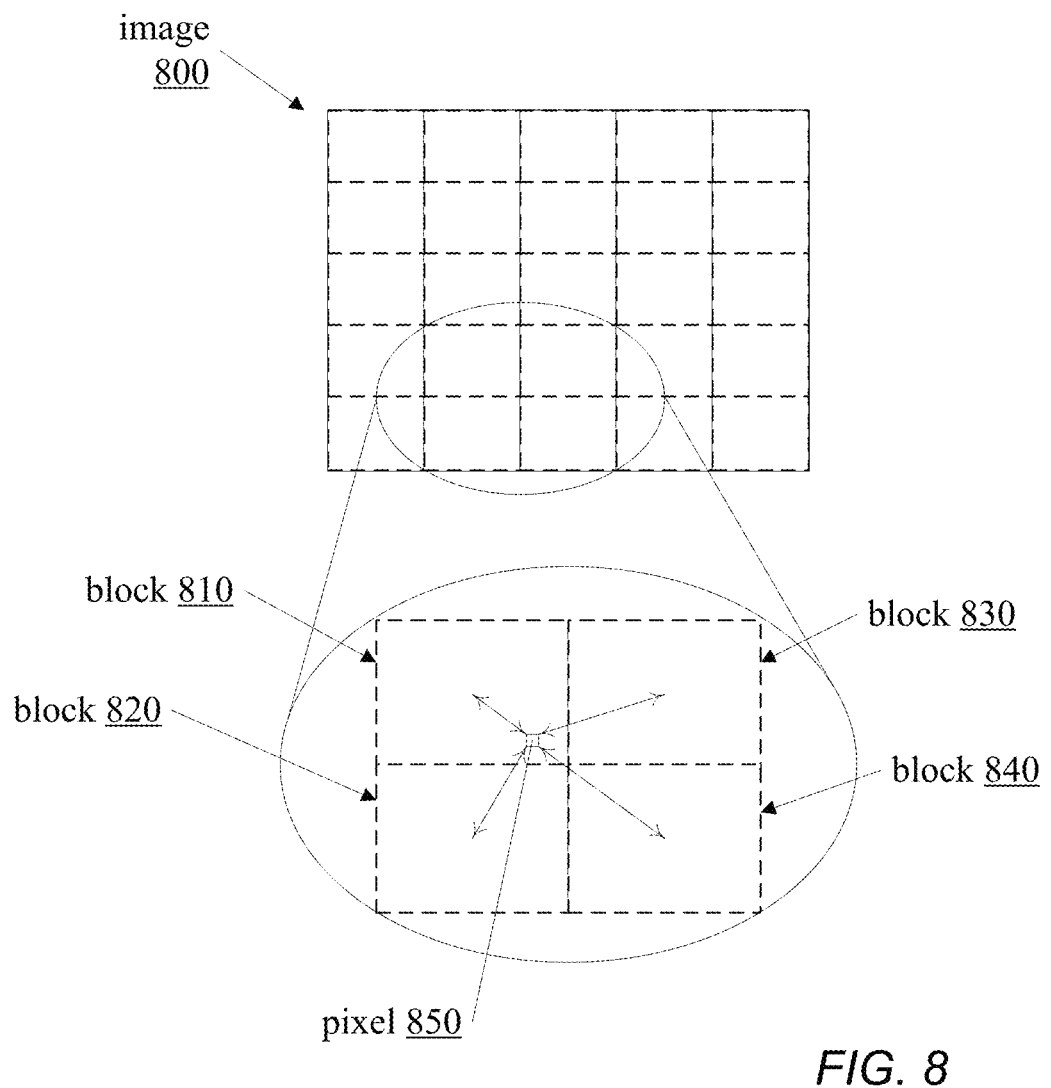
FIG. 8 is a logical block diagram illustrating the adjustment of a pixel based on local tone curves, according to one embodiment.

FIG. 8 is a logical block diagram illustrating the adjustment of a pixel based on local tone curves, according to one embodiment. As described above, when performing tone adjustments to an image based on the computed local tone curves (or the gain values), each pixel may be adjusted based on more than one local tone curve. For instance, as illustrated in FIG. 8, an image 800 may have been logically divided into multiple blocks and local tone curves may have been generated for each block, as described above. When generating the final image, based on the local tone curves, a single pixel, such as pixel 850 may be adjusted using the tone curves for multiple blocks. For example, in one embodiment, the local tone curves for four different logical blocks, such as blocks 810, 820, 830 and 840, may be used to adjust the luminance value (and therefore the color value) for pixel 850.

In general, the tone curves used to adjust pixel 850 may be combined or applied using any of various techniques, according to different embodiments. For example, in one embodiment, each tone curve to be used may be weighted according to the relative distance pixel 850 is from the center of the corresponding block. Thus, in the example illustrated in FIG. 8, the tone curve for block 810 may be the most heavily weighted tone curve, while the tone curve for block 840 may be the least weighted. Thus, according to some embodiments, each pixel of image 800 may be adjusted in a manner to help ensure smoothness of brightness changes across the image and to help reduce the introduction of visual artifacts (e.g. halo effects, ringing and/or other contrast distortions).

As noted above regarding FIG. 7, in one embodiment an interpolated tone curve may be generated based on multiple local tone curves and the interpolated tone curve may be used to adjust the luminance value of a pixel in image 800. In other embodiments, the same result may be obtained without actually generating a separate interpolated tone curve, such as by applying teach local tone curve individually to the pixel.

The number of local tone curves to use as well as the particular manner in which the local tone curves are combined when adjusting an image may vary from embodiment to embodiment. In addition, note that a local tone curve may be considered, or may be converted into, a lookup table (LUT) used for adjusting the luminance value for a pixel, according to some embodiments.

Figure 9:
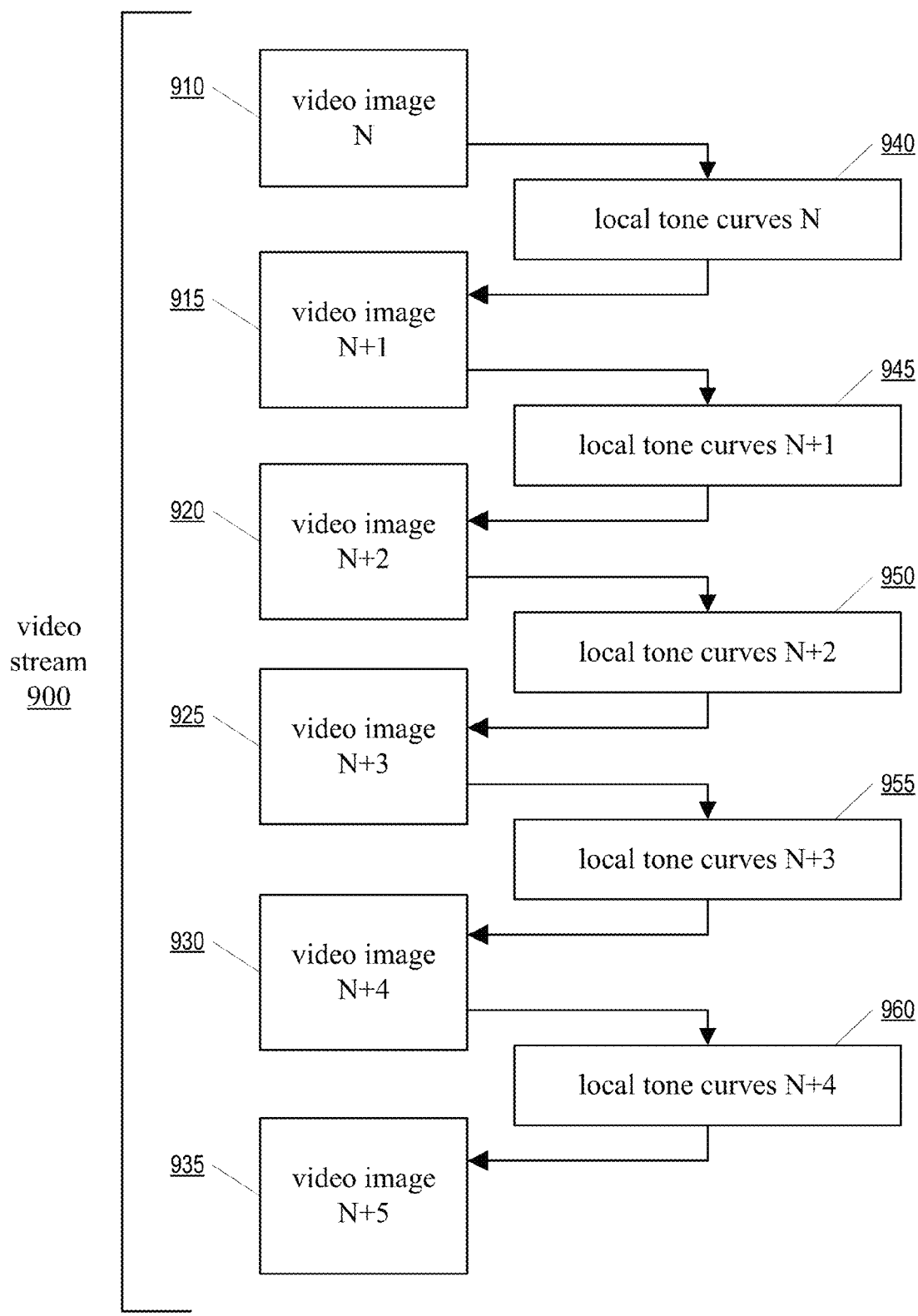
FIG. 9 is a logical block diagram illustrating the application of image tone adjustment using local tone curve computation to a video stream, according to one embodiment.

FIG. 9 is a logical block diagram illustrating the application of image tone adjustment using local tone curve computation to a video stream, according to one embodiment. As shown in FIG. 9 and noted above, the techniques described herein may be applied to images that are part of a video stream, either as those images are being captured (e.g., live) or afterwards. In some embodiments, image tone adjustment may be performed as part of the image capture pipeline within a digital camera, such as between the camera image sensor and the image storage. When applying image tone adjustment using local curve computation to a live video stream, the video stream may be captured at a speed that prevents each image from be analyzed and adjusted before the image must be saved to memory. Consequently, in some embodiments, the image used to generate the local tone curves may not be the same image to which the local tone curves are applied (e.g., when adjusting the image). In general, the dynamic range and/or brightness levels may not change much between video frames.

As shown in FIG. 9, a captured video stream 900 may include multiple image frames, such as video images 910, 915, 920, 925, 930 and 935. In the example video stream illustrated in FIG. 9, video image N may occur previously in the video stream than video image N+1 and video image N+1 may occur previously than video image n+2. Thus, in FIG. 9 the earlier video images appear higher in the figure and the later images appear lower in the figure. When applying image tone adjustment using local tone computation to the images in a video stream, the same techniques may be repeatedly applied to successive images in the video stream. Thus, in one embodiment, the local tone curves 940, 945, 950, 955 and 960 may be applied to video images 915, 920, 925, 930 and 935, respectively. Thus, in some embodiments, the local tone curves computed for one image may be applied to adjust the luminance range of a later image.

Figure 10:
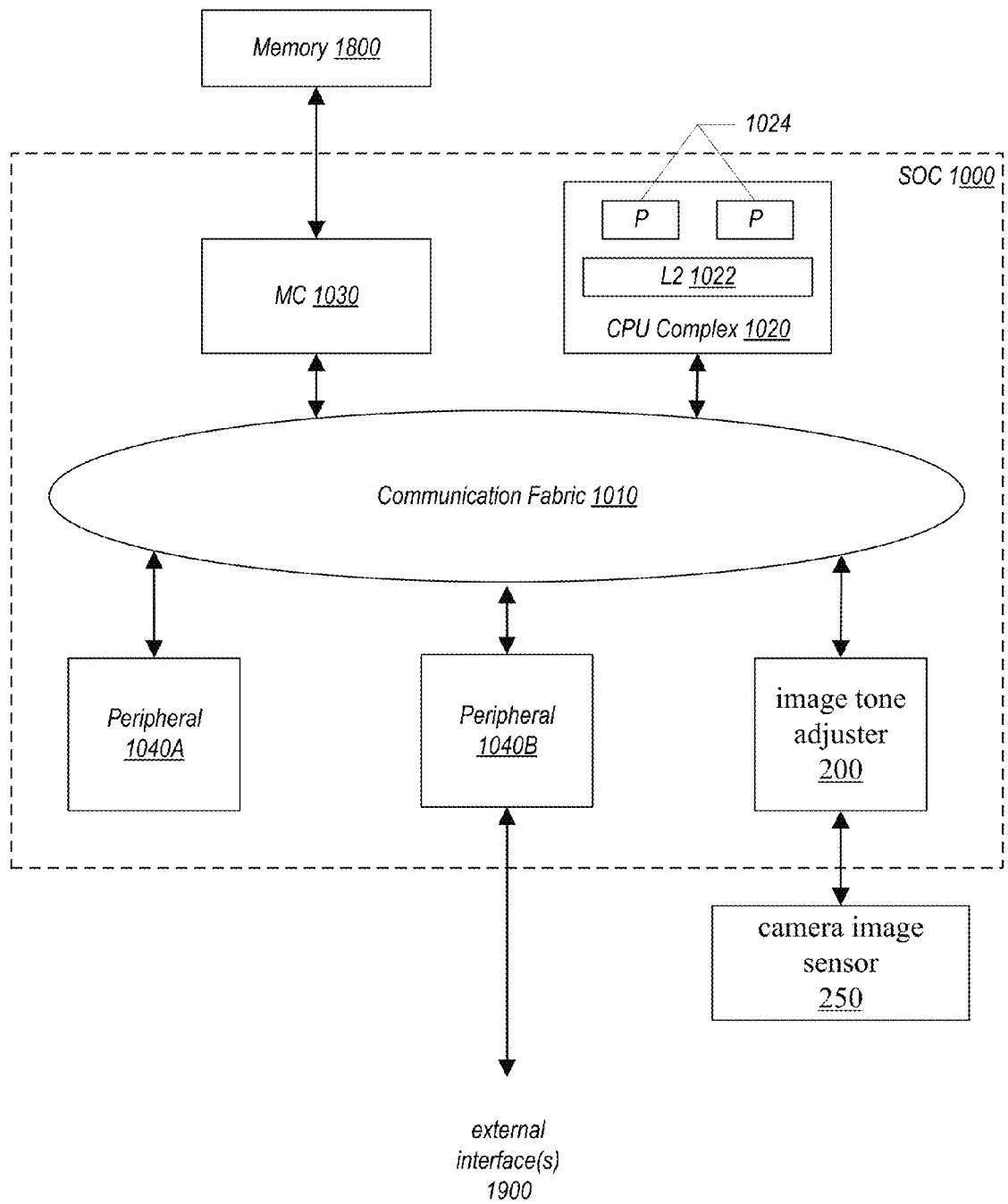
FIG. 10 is a logical block diagram illustrating one embodiment of a system configured to implement image tone adjustment using local tone curve computation, as described herein.

The techniques described herein for image tone adjustment using local tone curve computation may be implemented on any of a wide variety of computing devices. Turning now to FIG. 10, which illustrates one embodiment of system configured to implement image tone adjustment using local tone curve computation, as described herein. In general, the computer system illustrated in FIG. 10 may be any of various types of computing device, including, but not limited to, a personal computer system, desktop computer, laptop or notebook computer, mainframe computer system, handheld computing device, cellular phone, smartphone, mobile phone, workstation, network computer, a consumer device, application server, storage device, intelligent display, a peripheral device such as a switch, modem, router, etc., or in general any type of computing device. According to one example embodiment, the system illustrated in FIG. 10 may represent a system-on-a-chip (SOC). As implied by the name, the components of the SOC 1000 may be integrated onto a single semiconductor substrate as an integrated circuit "chip." In some embodiments, the components may be implemented on two or more discrete chips in a system. The SOC 1000 will be used as an example herein.

In the illustrated embodiment, the components of the SOC 1000 include a central processing unit (CPU) complex 1020, on-chip peripheral components 1040A-1040B (more briefly, "peripherals"), a memory controller (MC) 1030, a communication fabric 1010, and an image tone adjuster 200 (which may itself be considered a peripheral component). SOC 1000 may also be coupled to additional components, such as to memory 1800 and camera image sensor 250. The components 1020, 1030, 1040A-1040B, and 200 may all be coupled to the communication fabric 1010. The memory controller 1030 may be coupled to the memory 1800 during use, and the peripheral 1040B may be coupled to an external interface 1900 during use. Additionally, image tone adjuster 200 may be coupled to camera image sensor 250 during use. In the illustrated embodiment, the CPU complex 1020 includes one or more processors 1024 and a level two (L2) cache 1022.

The peripherals 1040A-1040B may be any set of additional hardware functionality included in the SOC 1000. For example, the peripherals 1040A-1040B may include display controllers configured to display video data on one or more display devices, graphics processing units (GPUs), video encoder/decoders, scalers, rotators, blenders, etc. Image tone adjuster 200 may, in some embodiments, be part of another video peripheral such as an image signal processor configured to process image capture data from camera image sensor 250 (or other image sensor). The peripherals may also include audio peripherals such as microphones, speakers, interfaces to microphones and speakers, audio processors, digital signal processors, mixers, etc. The peripherals may include peripheral interface controllers for various interfaces 1900 external to the SOC 1000 (e.g. the peripheral 1040B) including interfaces such as Universal Serial Bus (USB), peripheral component interconnect (PCI) including PCI Express (PCIe), serial and parallel ports, etc. The peripherals may further include networking peripherals such as media access controllers (MACs). In general, any set of hardware may be included, according to various embodiments.

More particularly in FIG. 10, SOC 1000 may include at least one instance of an image tone adjuster component, for example image tone adjuster 200 as illustrated in FIG. 2 that includes components, such as image data processor 210, target luminance component 220, histogram generator 230 and/or local tone curve generator 240, that may be configured to implement image tone adjustment using local tone curve computation, as described herein.

The CPU complex 1020 may include one or more CPU processors 1024 that serve as the CPU of the SOC 1000. The CPU of the system may include the processor(s) that execute the main control software of the system, such as an operating system. Generally, software executed by the CPU during use may control the other components of the system to realize the desired functionality of the system. The processors 1024 may also execute other software, such as application programs. The application programs may provide user functionality, and may rely on the operating system for lower level device control. Accordingly, the processors 1024 may also be referred to as application processors. The CPU complex 1020 may further include other hardware such as the L2 cache 1022 and/or and interface to the other components of the system (e.g. an interface to the communication fabric 1010).

Generally, a processor may include any circuitry and/or microcode configured to execute instructions defined in an instruction set architecture implemented by the processor. The instructions and data operated on by the processors in response to executing the instructions may generally be stored in the memory 1800, although certain instructions may be defined for direct processor access to peripherals as well. Processors may encompass processor cores implemented on an integrated circuit with other components as a system on a chip (SOC 1000) or other levels of integration. Processors may further encompass discrete microprocessors, processor cores and/or microprocessors integrated into multichip module implementations, processors implemented as multiple integrated circuits, etc.

The memory controller 1030 may generally include the circuitry for receiving memory operations from the other components of the SOC 1000 and for accessing the memory 1800 to complete the memory operations. The memory controller 1030 may be configured to access any type of memory 1800. For example, the memory 1800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 1030 may include queues for memory operations, for ordering (and potentially reordering) the operations and presenting the operations to the memory 1800. The memory controller 1030 may further include data buffers to store write data awaiting write to memory and read data awaiting return to the source of the memory operation. In some embodiments, the memory controller 1030 may include a memory cache to store recently accessed memory data. In SOC implementations, for example, the memory cache may reduce power consumption in the SOC by avoiding re-access of data from the memory 1800 if it is expected to be accessed again soon. In some cases, the memory cache may also be referred to as a system cache, as opposed to private caches such as the L2 cache 1022 or caches in the processors 1024, which serve only certain components. Additionally, in some embodiments, a system cache need not be located within the memory controller 1030.

In an embodiment, the memory 1800 may be packaged with the SOC 1000 in a chip-on-chip or package-on-package configuration. A multichip module configuration of the SOC 1000 and the memory 1800 may be used as well. Such configurations may be relatively more secure (in terms of data observability) than transmissions to other components in the system (e.g. to the end points 16A-16B). Accordingly, protected data may reside in the memory 1800 unencrypted, whereas the protected data may be encrypted for exchange between the SOC 1000 and external endpoints.

The communication fabric 1010 may be any communication interconnect and protocol for communicating among the components of the SOC 1000. The communication fabric 1010 may be bus-based, including shared bus configurations, cross bar configurations, and hierarchical buses with bridges. The communication fabric 1010 may also be packet-based, and may be hierarchical with bridges, cross bar, point-to-point, or other interconnects.

It is noted that the number of components of the SOC 1000 (and the number of subcomponents for those shown in FIG. 10, such as within the CPU complex 1020) may vary from embodiment to embodiment. There may be more or fewer of each component/subcomponent than the number shown in FIG. 10.

In some embodiments, the methods described herein may be implemented by a computer program product, or software. In some embodiments a non-transitory, computer-readable storage medium may have stored thereon instructions which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD- ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1100 may include a processor unit 1020 (possibly including multiple processors, a single-threaded processor, a multi-threaded processor, a multi-core processor, etc.) which may be configured to execute one or more modules, such as image tone adjuster 200, image data processor 210, target luminance component 220, histogram generator 230, and/or local tone curve generator 240, which may be present within program instructions stored in memory 1800 of the same computer system or may be present within program instructions stored within a memory of another computer system similar to or different from computer system 1000. In some embodiments, the various components configured to implement image tone adjustment using local tone curve computation may be part of different computer systems working together. For example, in one embodiment, computer system 800 may include image data processor 210 while in other embodiments, computer system 1000 may include target luminance component 220. In yet other embodiments, computer system 1000 may include both image data processor 210 and image data processor 210, target luminance component 220, histogram generator 230, and/or local tone curve generator 240, such as within image tone adjuster 200.

System memory 1800 may include program instructions configured to implement some or all of the techniques described herein for image tone adjustment using local tone curve computation (according to any of the embodiments described herein). For example, memory 1800 may include code to implement and/or execute any or all of the components of image tone adjuster 200.

In various embodiments, image tone adjuster 200, image data processor 210, target luminance component 220, histogram generator 230, and/or local tone curve generator 240, and/or individual sub-modules of these components may each be implemented in any of various programming languages or methods. For example, in one embodiment, image tone adjuster 200, image data processor 210, target luminance component 220, histogram generator 230, and/or local tone curve generator 240 may be JAVA based, while in another embodiment, image tone adjuster 200, image data processor 210, target luminance component 220, histogram generator 230, and/or local tone curve generator 240 may be written using the C or C++ or assembly programming languages. Moreover, in some embodiments, image tone adjuster 200, image data processor 210, target luminance component 220, histogram generator 230, and/or local tone curve generator 240 as well as various sub-modules of them may not be implemented using the same programming language.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system comprising:
a memory configured to store target luminance values; and
an image data processor configured to:
for one or more blocks of an image:
determine one or more tone adjustment values that, when applied to both a representation of a distribution of luminance values for a block and to representations of distributions of luminance values for one or more neighboring blocks, generate luminance values for both the block and the one or more neighboring blocks that match or approximate corresponding luminance values of the target luminance values; and
perform the one or more tone adjustments on the image according to the one or more tone adjustment values.

2. The system of claim 1, wherein the image comprises a video frame of a video stream, and wherein the image data processor is further configured to:
generate the target luminance values based at least in part on blocks of an image for a previous video frame of the video stream, wherein the target luminance values are based at least in part on a brightness representation of the image for the previous video frame of the video stream.

3. The system of claim 1, wherein the image is a first image, and wherein the image data processor is further configured to:
generate the target luminance values based at least in part on blocks of a second image, wherein the second image is determined to be similar to the first image, and wherein the target luminance values are based at least in part on a brightness representation of the second image.

4. The system of claim 1, wherein the image data processor is further configured to:
generate the target luminance values for the blocks of the image, wherein the target luminance values are based at least in part on a brightness representation of the image.

5. The system of claim 1, wherein the representation of the distribution of luminance values for the block comprises luminance histogram information for the block, and wherein to determine the one or more tone adjustment values the image data processor is further configured to:
define a relationship between the target luminance values, the determined one or more tone adjustment values, and the luminance histogram information for the block, wherein the defined relationship comprises an under-constrained optimization problem; and apply an optimization solving technique to the defined relationship according to one or more optimization constraints.

6. The system of claim 5, wherein the histogram information for the blocks comprises luminance distribution information for a plurality of bins of a histogram, and wherein the defined relationship comprises a relationship between respective luminance distribution information for the block and the one or more neighboring blocks, luminance values for the plurality of bins, the one or more tone adjustment values, and the target luminance values.

7. The system of claim 5, wherein to apply the optimization solving technique the image data processor is further configured to apply one or more problem solving algorithms such that the one or more optimization constraints are minimized.

8. The system of claim 7, wherein the one or more optimization constraints comprise one of: a smoothness constraint in regard to the determined one or more tone adjustment values or an identity constraint in regard to the determined one or more tone adjustment values.

9. The system of claim 7, wherein the one or more tone adjustment values comprise a local tone curve, and wherein the one or more optimization constraints comprise one of: a positive slope constraint on the local tone curve, a minimum slope constraint on the local tone curve, or a maximum slope constraint on the local tone curve.

10. The system of claim 1, wherein to determine the one or more tone adjustment values the image data processor is further configured to generate a local tone curve for the block.

11. The system of claim 4, wherein to determine the one or more tone adjustment values the image data processor is further configured to:
generate one or more gains for each of the blocks that, when applied to the respective histogram information for the block and the one or more neighboring blocks, generates new luminance values for the block and each of the determined one or more neighboring blocks that match or approach the respective target luminance values for the block and the one or more neighboring blocks; and
wherein to perform the determined one or more tone adjustments the image data processor is further configured to adjust the image based on the local tone curves.

12. The system of claim 4, wherein the image data processor is further configured to:
generate a downsampled version of the image, wherein the downsampled version comprises the brightness representation of the image; and
wherein to generate the target luminance values the image data processor is further configured to generate a target version of the downsampled version comprising the target luminance values such that one or more target luminance values of the downsampled version corresponds to the blocks of the image.

13. A method comprising:
performing, by one or more computing devices, one or more tone adjustments on one or more blocks of an image, wherein said performing comprises:
for the one or more blocks of the image:
determining one or more tone adjustment values that, when applied to both a representation of a distribution of luminance values for a block and to representations of distributions of luminance values for one or more neighboring blocks, generate luminance values for both the block and the one or more neighboring blocks that match or approximate corresponding luminance values of target luminance values; and
performing the one or more tone adjustments on the image according to the one or more tone adjustment values.

14. The method of claim 13, wherein the image comprises a current video frame of a video stream, and wherein the method further comprises:
generating the target luminance values based at least in part on blocks of a previous image for a previous video frame of the video stream, wherein said generating the target luminance values is based at least in part on a brightness representation of the previous image for the previous video frame of the video stream; and
repeating said generating, said determining, and said performing, for successive video frame images and successive corresponding previous video frame images.

15. The method of claim 13, wherein the representation of the distribution of luminance values for the block comprises luminance histogram information for the blocks of the image, and wherein said determining the one or more tone adjustment values comprises:
defining a relationship between the target luminance values, the determined one or more tone adjustment values, and respective luminance histogram information for the block, wherein the defined relationship comprises an under-constrained optimization problem; and
applying an optimization solving technique to the defined relationship according to one or more optimization constraints.

16. The method of claim 13, further comprising:
generating the target luminance values, wherein said generating comprises:
generating an original brightness representation for the image; and
determining the target luminance values for the target brightness representation such that an overall luminance range for the target brightness representation is reduced as compared to an overall luminance range for the original brightness representation.

17. The method of claim 15, wherein said performing the one or more tone adjustments comprises:
for pixels of the image:
determining an interpolated tone curve for a given pixel based on tone adjustment values for one or more blocks near the given pixel; and
adjusting a luminance value for the given pixel based on the interpolated tone curve.

18. A system comprising:
a memory configured to store target luminance values, wherein the target luminance values are determined based on desired luminance values of an image; and
an image data processor configured to:
generate tone curves for one or more blocks of the image, wherein the tone curves are based at least in part on the target luminance values and on representations of distributions of luminance values for the one or more blocks of the image; and
for pixels of the one or more blocks of the image:
determine a luminance value adjustment for a given pixel based at least in part on tone curves for a block comprising the pixel and on tone curves for one or more neighboring blocks; and
adjust a luminance value for the given pixel based at least in part on the luminance value adjustment for the given pixel.

19. The system of claim 18, wherein to determine the luminance value adjustment, the image data processor is further configured to:
   determine a combination of the one or more tone curves for the one or more neighboring blocks.

20. The system of claim 19, wherein to determine the combination, the image data processor is further configured to:
   determine a weighted average of the one or more tone curves for the one or more neighboring blocks based on a respective distance between the pixel in the block and respective pixels in the one or more neighboring blocks, wherein the respective pixels in the one or more neighboring blocks are positioned in a center of the respective one or more neighboring blocks.

* * * * *